UNITED STATES PATENT OFFICE.

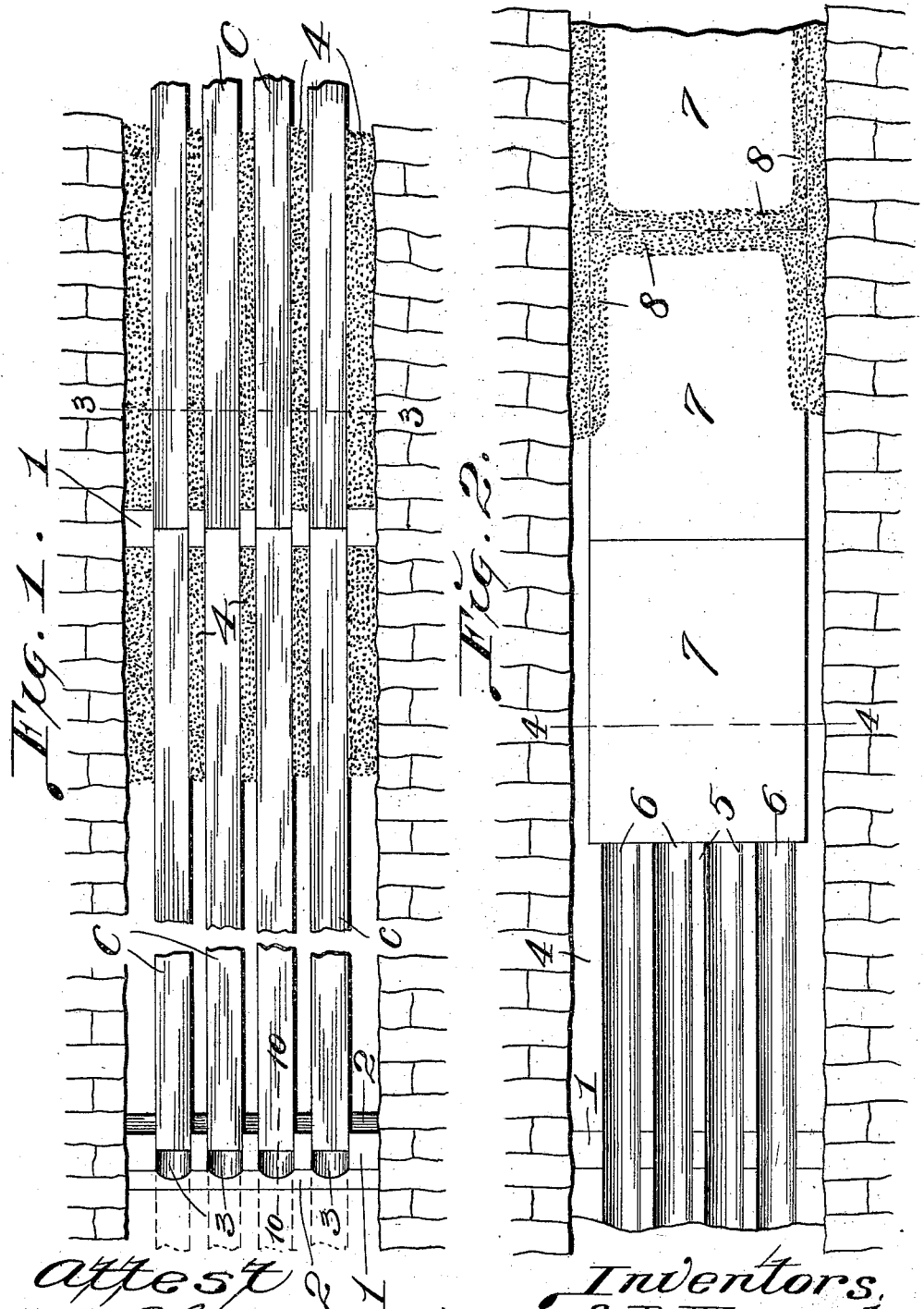
S. B. WAY & E. C. FREEZE.
UNDERGROUND CONDUIT.
APPLICATION FILED AUG. 19, 1907.
928,826.
Patented July 20, 1909.
2 SHEETS—SHEET 1.

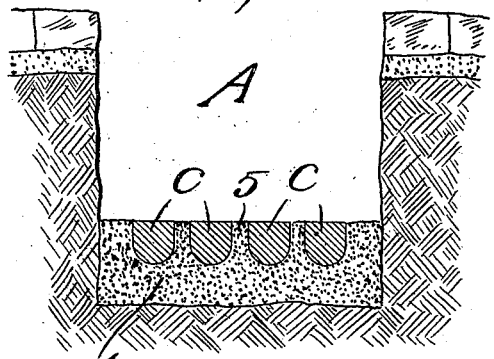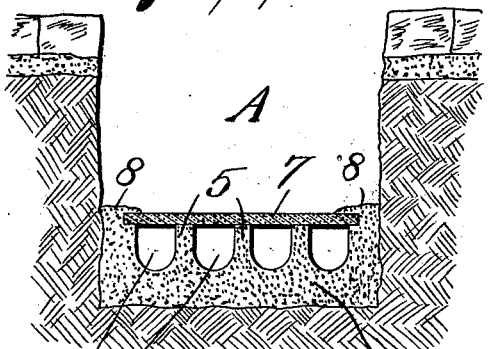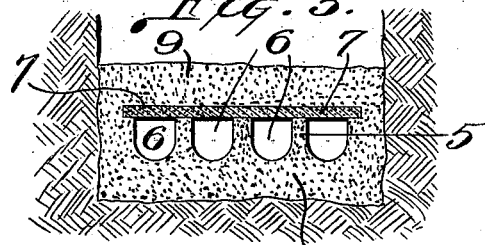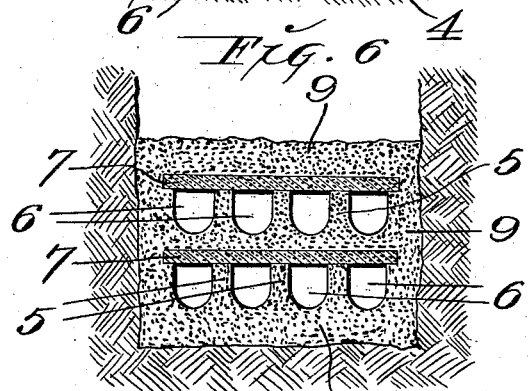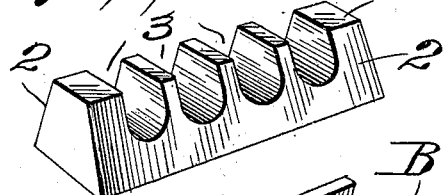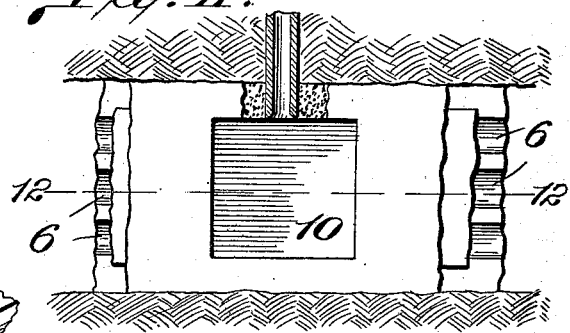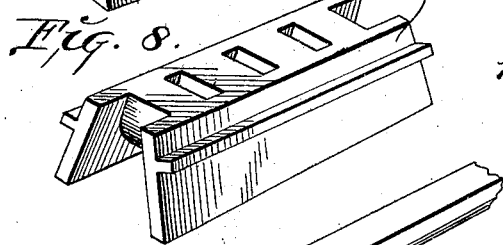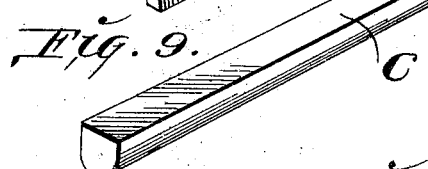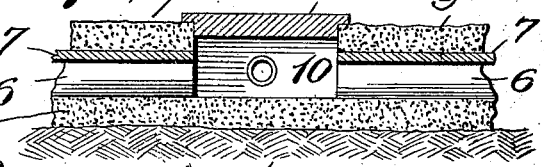

SYLVESTER B. WAY AND ELISHA C. FREEZE, OF ST. LOUIS, MISSOURI.

UNDERGROUND CONDUIT.

No. 928,826.    Specification of Letters Patent.    Patented July 20, 1909.

Application filed August 19, 1907.   Serial No. 389,297.

*To all whom it may concern:*

Be it known that we, SYLVESTER B. WAY and ELISHA C. FREEZE, both citizens of the United States, and residents of St. Louis, Missouri, have invented certain new and useful Improvements in Underground Conduits, of which the following is a specification containing a full, clear, and exact description, reference being had to the accompanying drawings, forming a part hereof.

Our invention relates to an underground conduit, particularly adapted for receiving and housing electric wires and cables, and the object of our invention is to construct a conduit of concrete, or analogous plastic material, which is entirely seamless throughout its length, and the ducts or passageways of which have continuous smooth surfaces, thereby permitting the wires and cables to be readily positioned in said ducts or passageways after the conduit is completed.

To the above purposes, our invention consists in certain novel features of construction and arrangement of parts, which will be hereinafter more fully set forth, pointed out in the claims, and illustrated in the accompanying drawings, in which:—

Figure 1 is a plan view of a portion of the conduit in the process of construction, with the duct-forming molds arranged in position at the bottom of the trench upon transverse pillow blocks; Fig. 2 is a plan view of the conduit as it appears during the process of construction, with the slabs or plates in position to cover the ducts or passageways in the conduit; Fig. 3 is a transverse section taken on the line 3—3 of Fig. 1; Fig. 4 is a transverse section taken on the line 4—4 of Fig. 2; Fig. 5 is a transverse section analogous to Fig. 4, and showing the conduit completed; Fig. 6 is a transverse section of a conduit of our improved construction, having two sets of ducts or passageways; Fig. 7 is a perspective view of one of the pillow blocks, such as is primarily formed in the bottom of the trench, and which pillow blocks become an integral part of the conduit when the same is finished; Fig. 8 is a perspective view of the mold used in forming the pillow blocks; Fig. 9 is a perspective view of a portion of one of the molds used in forming the ducts in the conduit; Fig. 10 is a vertical section taken on the line 10—10 of Fig. 1; Fig. 11 is a plan view, partly in section, of a chamber or opening formed in the conduit for the purpose of connecting a lateral wire or cable; Fig. 12 is a vertical section taken on the line 12—12 of Fig. 11.

In the construction of our improved conduit, a trench A, of suitable depth, is formed in the ground; and in the bottom of said trench, at suitable distances apart, is formed a series of pillow blocks or mold supports 1, having side faces 2 inclined in opposite directions; and formed in the tops of said pillow blocks are horizontally disposed pockets or recesses 3, which are U-shaped in cross section. These pillow blocks or mold supports are preferably formed of concrete, or analogous plastic material, which becomes hard when dry; and to insure uniformity in the construction of said pillow blocks, they are formed beneath molds B, of wood or metal, which are so constructed as to give the proper shape to said blocks when the concrete is placed in said molds. After the pillow blocks or mold supports have become sufficiently hardened, duct molds C, of wood, or analogous material, and which are U-shaped in cross section, are positioned in the lower portion of the trench, with their ends fitted into the U-shaped openings or recesses 3, in the tops of the pillow blocks. Concrete, or analogous material, while in plastic condition, is now placed in the bottom of the trench, between and beneath the molds C until the entire space below the flat tops of said molds C is completely filled, and the concrete so positioned forms the base 4 of the conduit, the ends of which base lie immediately against and form a bond with the inclined side faces 2 of the pillow blocks 1. While the molds C are thus embedded in the concrete, they are held in proper position by weights, or in any suitable manner. The portions of this filling of concrete which lie between the molds C form the partition walls 5 between the ducts or passageways of the conduit. After the concrete forming the base 4 and walls 5 has become sufficiently hardened, the molds C are removed, and thus a series of continuous grooves are formed in the top of the base, which grooves, together with the pockets or recesses 3 in the pillow blocks, form the ducts or passageways 6 of the conduit; and the bond between the ends of the conduit base, with the pillow blocks, providing continuous smooth surfaces for the ducts through said pillow blocks. Rectangular plates or slabs 7, preferably formed of concrete and having perfectly smooth surfaces, are now positioned on top of the base 4 so as to cover all of the ducts 6, after which concrete 8, in plastic condition, is located upon the side edges of said plates or slabs and on top of the meeting edges thereof, thus firmly sealing the plates or slabs to the base and to one another. After this concrete 8 has become sufficiently hardened, a layer or covering 9 of plastic concrete, or analogous material, is poured immediately on top of the plates or slabs 7 and the concrete 8; and when this last body of concrete has become thoroughly hardened, the conduit is complete, and all the parts thereof are perfectly bonded and form a seamless rigid conduit, which is impervious to water, and in which is formed a series of continuous ducts or passageways, having smooth surfaces, through which wires and cables may be readily drawn into position for use.

Where it is desired to form a conduit with a series of superimposed ducts or passageways, pillow blocks are formed immediately on top of the plates or slabs 7, and the operation incident to the formation of the first series of ducts is repeated to form the upper or second series of ducts.

Openings 10, which perform the function of service boxes, are formed in the conduit wherever desired, which openings intersect the ducts or passageways 6, said openings being normally closed by plates, such as 11, of concrete, or analogous material, and said openings being for the purpose of connecting branch wires or cables which extend laterally from the conduit. Heretofore, in the formation of these boxes, they have been constructed of brick, and cast iron, or other suitable material, but constructed separately from the formation of the conduit, and provided with a heavy cast iron or steel cover, affording an opening from the surface of the ground. By our improved system of forming these boxes of the same kind of material and simultaneously with the formation of the conduit, we eliminate the expense of constructing service boxes and having openings to the street, and can provide means of entrance to the conduit at as frequent intervals as desired, without appreciable increased cost in constructing the conduit. The formation of these connection boxes permits the tapping of the service cable at no additional conduit construction expense, and saves paralleling the main service cable with the service connection cables, which would be necessary with more expensive service boxes located at less frequent intervals.

Our improved conduit can be very quickly and cheaply formed, insures uniform ducts or openings having perfectly smooth surfaces, particularly at the intersection of the pillow blocks, which latter become an integral part of the conduit, and said conduit being perfectly rigid and impervious to water and the action of electrolysis.

It will be seen from the foregoing description of our invention, that, in the formation of the same, when the proper trench is dug and the concrete is mixed adjacent thereto, and then dumped into the trench in its green state, the single operation of dumping the material into the trench forms the complete base section of the conduit; and all successive layers of ducts are formed in the same manner, thereby eliminating the factory, cartage, breakage, and waste of material features. The conduit so formed forms a continuous and practically seamless and homogeneous mass, and eliminates the necessity of using any separately formed pipes to produce the ducts through the mass of concrete.

We claim:—

1. A conduit of the class described, a series of mold supports arranged at suitable distances apart in the bottom of the trench in which the conduit is formed, there being recesses formed in the tops of said mold supports, a base of plastic material between said mold supports, the ends of which base are bonded to the mold supports, there being ducts formed in the top of the base, which ducts are in alinement and communicate with the recesses formed in the tops of the mold supports, and a body of plastic material located on top of the base and the mold supports and bonded thereto to form a top for the ducts.

2. A conduit of the class described, comprising a series of mold supports arranged at suitable distances apart in the bottom of the trench when the conduit is formed, there being recesses formed in the tops of said mold supports, a base of plastic material between said mold supports, the ends of which base are bonded to the mold supports, there being ducts formed in the top of the base in alinement and communicating with the recesses in the tops of the mold supports, a series of plates arranged on top of the base and the mold supports, which plates form a top for the ducts, and a body of plastic material arranged on top of the plates and bonded thereto and to the sides of the base.

3. The herein described continuous integral conduit, comprising a series of mold supports arranged at suitable distances apart in the bottom of the trench when the conduit is formed, which mold supports are provided with oppositely inclined side faces and with recesses in their tops, a base of plastic material between the mold supports, the ends of which base are bonded to the inclined side faces of the mold supports, there being a plurality of parallel ducts formed in the top of said base, which ducts are in alinement and communicating with the recesses in the mold supports, and a body of plastic material located on top of the base and the mold supports, and bonded thereto and forming a top for the ducts.

4. The herein described continuous integral conduit, comprising a series of mold supports arranged at suitable distances apart in the bottom of the trench in which the conduit is formed, which mold supports are provided with oppositely inclined side faces and with recesses in their tops, a base of plastic material arranged between the mold supports, the ends of which base are bonded to the inclined side faces and provided with recesses in their tops, a base of plastic material arranged between the mold supports, the ends of which base are bonded to the inclined side faces of the mold supports, said base being provided with a plurality of parallel ducts which are in alinement with the recesses in the mold supports, a series of plates arranged on top of the base and the mold supports, which plates form a top for the ducts, and a body of plastic material arranged on top of the plates and bonded thereto and to the top of the base at the sides thereof.

5. A conduit of the class described, comprising a continuous base section, constructed of plastic material, there being a duct formed in said base section, mold supports located at suitable distances apart throughout said base section and bonded thereto, there being recesses formed in the top of said mold supports, corresponding in contour to the duct formed in said base section, and a body of separately formed plastic material located on the top of said base section, and bonded thereto, and to the tops of the mold supports embedded in said base section.

6. A conduit of the class described, comprising a continuous base section, constructed of plastic material, there being a duct formed in said base section, mold supports located at suitable distances apart throughout said base section and transversely arranged relative to the base section, there being recesses formed in the top of said mold supports, corresponding in contour to the duct formed in said base section, and a body of separately formed plastic material located on the top of said base section, and bonded thereto, and to the tops of the mold supports embedded in the base section.

7. A conduit of the class described, comprising a base section, constructed of plastic material, there being a duct formed in said base section, mold supports located at suitable distances apart throughout said base section, there being recesses formed in the top of said mold supports, corresponding in contour to the duct formed in said base section, a body of separately formed plastic material located on the top of said base section and bonded to said base section and to the tops of the mold supports embedded in the base section, connection boxes constructed of plastic material formed at predetermined locations and intercepting predetermined ducts, said connection boxes being formed integral with the body of the conduit leading into said connection box, and a cover for said connection box located on top of the conduit and beneath the surface of the ground in which the conduit is formed.

8. A conduit of the class described, comprising a continuous base portion of self hardening plastic material, said base portion being formed in and defined by the contour of the bottom and sides of the trench in which the conduit is formed, the said base section being provided with a longitudinal open-topped duct formed in said base section simultaneously with the dumping of the plastic material in the ditch, and a body of separately formed plastic material located on the top of the base section and forming a cover for the duct therein, the side edges of said cover being spaced apart from the side walls of the trench.

9. A conduit of the class described, comprising a continuous base portion of plastic material, in the top of which is formed a duct, mold supports located in the bottom of the trench in which the conduit is formed and arranged at suitable distances apart throughout the length of the base portion, a body of plastic material located on top of the base portion and bonded thereto and to the tops of the mold supports embedded in the base portion, and connection boxes of plastic material located at predetermined intervals throughout the length of the conduit and the interiors of which boxes communicate with the ducts formed in the conduit.

10. A conduit of the class described, comprising a continuous base section, constructed of plastic material, there being a duct formed in said base section, mold supports located at suitable distances apart throughout said base section, there being recesses formed in the top of said mold supports, corresponding in contour to the ducts formed in said base section, and separately formed plates of plastic material of less width than the base section located on the top of said base section, and bonded thereto, and forming a cover for the duct formed in the conduit.

11. A conduit of the class described, comprising a continuous base section constructed of plastic material, formed and defined by the contour of the bottom and sides of the trench in which it is laid, there being a duct formed in the top of said base section, mold supports located at suitable distances apart throughout said base section, there being recesses formed in the top of said mold supports, corresponding in contour to the duct formed in said base section, a body of separately formed material located on the top of said base section, and a body of plastic material bonded to the top of the base section at the sides thereof and to the body of separately formed material on the top of said base section.

12. A conduit of the class described, comprising a continuous base portion of self hardening plastic material, said base portion being formed in and defined by the contour of the bottom and sides of the trench in which the conduit is formed, the said base section being provided with a longitudinal open-topped duct of uniform depth and width throughout its length formed in said base section simultaneously with the dumping of the plastic material in the ditch, and a body of separately formed plastic material located on the top of the base section and forming a cover for the duct therein, the side edges of said cover being spaced apart from the side walls of the trench.

13. A conduit of the class described, comprising a continuous base portion of self hardening plastic material, said base portion being formed in and defined by the contour of the bottom and sides of the trench in which the conduit is formed, the said base section being provided with a longitudinal open-topped duct of uniform depth and width throughout its length formed in said base section simultaneously with the dumping of the plastic material in the ditch, and a body of separately formed plastic material located on the top of the base section and forming a cover for the duct therein, the side edges of said cover being spaced apart from the side walls of the trench, which body of separately formed plastic material is bonded to the upper portion of the base section.

14. A conduit of the class described, comprising a continuous base section of self hardening plastic material, which base section is formed in and defined by the contour of the bottom and sides of the trench in which it is laid, a series of parallel open-mouthed ducts formed in the top of said base section simultaneously with the dumping of the material out of which the base section is formed into the ditch, each of which ducts is uniform in width and depth throughout its length, a body of separately formed self hardening plastic material of less thickness and width than the base section located on top of the base section and forming a cover for the ducts therein, and which body of separately formed plastic material is bonded along its side edges to the upper portion of the base section.

In testimony whereof, we have signed our names to this specification, in presence of two subscribing witnesses.

SYLVESTER B. WAY.
ELISHA C. FREEZE.

Witnesses:
M. P. SMITH,
E. L. WALLACE.